United States Patent [19]

DeGunther et al.

[11] Patent Number: 5,519,389

[45] Date of Patent: May 21, 1996

[54] SIGNAL SYNCHRONIZED DIGITAL FREQUENCY DISCRIMINATOR

[75] Inventors: Richard DeGunther, Cameron Park, Calif.; Thomas R. Sikora, Mesa, Ariz.

[73] Assignee: Tomar Electronics, Inc., Gilbert, Ariz.

[21] Appl. No.: 859,834

[22] Filed: Mar. 30, 1992

(Under 37 CFR 1.47)

[51] Int. Cl.⁶ .................................................. H04B 10/06
[52] U.S. Cl. ............................. 340/870.29; 340/870.26; 250/214 R; 359/158; 359/189
[58] Field of Search ........................ 340/870.29, 870.26, 340/825.71, 825.73; 359/158, 189; 250/214 R, 227.12

[56] References Cited

U.S. PATENT DOCUMENTS

| | | | |
|---|---|---|---|
| 3,668,674 | 6/1972 | Westendorf | 340/870.29 |
| 3,727,185 | 4/1973 | Jones et al. | 359/158 |
| 3,831,039 | 8/1974 | Henschel | 307/234 |
| 4,162,477 | 7/1979 | Munkberg | 340/32 |
| 4,230,992 | 10/1980 | Munkberg | 328/140 |

OTHER PUBLICATIONS

Opticom Priority Control System, Safety and Security Systems Division/3M brochure No. 75–0299–3854–7(126.5)II re Optical Detector Model 205.

*Primary Examiner*—John K. Peng
*Assistant Examiner*—Daniel J. Wu
*Attorney, Agent, or Firm*—Cahill, Sutton & Thomas

[57] ABSTRACT

A digital frequency discriminator processes input pulses including first and second time separated input pulses to determine if the frequency of any two sequential pulses lie within a predetermined frequency band with upper and lower frequency limits and that they are received for at least a predetermined period of time. A delay timer is coupled to sense the input pulse stream and operates in a pulse sensing standby mode prior to receipt of the first input pulse. Upon receipt of the first input pulse, the delay timer switches into a time-limited active mode to define a fixed duration delay interval having a duration equal to the period of the upper frequency limit of the frequency band. The delay timer switches back into the pulse sensing standby mode upon completion of the delay interval. A gate timer is coupled to the output of the delay timer and switches from a standby mode into a time-limited active mode upon completion of the delay interval to define a fixed duration bandwidth interval. A monitoring circuit includes a first input coupled to monitor the input pulse stream and a second input coupled to monitor the output of the gate timer. The monitoring circuit generates a frequency coincidence signal when the second input pulse is received during the bandwidth interval to indicate that the frequency of the input pulse lies within the predetermined frequency band. A recognition circuit is coupled to monitor the output of the coincidence detector to ensure that the coincidence signal is received for at least a predetermined period of time.

44 Claims, 13 Drawing Sheets

SIGNAL SYNCHRONIZED DIGITAL FREQUENCY DISCRIMINATOR

BACKGROUND OF THE INVENTION

1. Field of the Invention

This invention relates to digital frequency discriminator circuits, more particularly, to digital frequency discriminators capable of determining whether the frequency of an input pulse train lies within a predetermined frequency band with upper and lower frequency limits for a predetermined period of time.

2. Description of the Prior Art

Various prior art devices have been developed to detect the presence of an optical input pulse train.

U.S. Pat. No. 3,831,039 (Henschel) includes four separate pulse generator circuits operating in combination with two spaced apart electronic switches to determine whether the frequency of an input train lies above a predetermined frequency limit. The circuit taught by Henschel is configured as a digital high pass filter and can determine only whether the frequency of an input pulse train exceeds a predetermined frequency threshold.

U.S. Pat. Nos. 4,162,477 and 4,230,992 (Munkberg) discloses a remote control system for a traffic signal control. This system includes an optical signal discriminator, the primary elements of which are controlled and synchronized by an eight phase master clock or pulse generator. The presence or absence of an input pulse train has no effect on the clock synchronized circuit which runs continuously. This system is synchronized to the eight phase clock and is not synchronized with respect to the input pulse train. The Munkberg optical signal discriminator is manufactured and sold by 3-M and is housed in a plastic enclosure having two spaced-apart, tubular optical input ports as depicted in a 3-M Opticom Priority Control System brochure.

SUMMARY OF THE INVENTION

It is therefore a primary object of the present invention to provide a digital frequency discriminator circuit for digitally processing input pulses including first and second time separated input pulses to determine if the frequency of any two sequential pulses lie within a predetermined frequency band with upper and lower frequency levels for a predetermined period of time without using a master clock to establish central control over and synchronization between the various separate elements of the signal processing circuit.

Another object of the present invention is to provide a digital frequency discriminator which operates in the absence of an input signal in an inactive or standby state where no timing or signal processing function takes place.

Another object of the present invention is to provide a digital frequency discriminator which transitions from a standby state into an active state upon receipt of an input pulse train and which subsequently synchronizes all circuit timing functions to timing established by the input signal itself.

Yet another object of the present invention is to provide a digital frequency discriminator which includes only two, series-connected timing elements including a delay timer having a fixed duration period $T_1$ and a gate timer having a fixed duration period $T_2$.

Yet another object of the present invention is to provide a digital frequency discriminator which conserves power by operating in a non-signal processing standby mode in the absence of an input pulse train and which transitions into an active, signal processing mode only upon receipt of an input pulse train.

Still another object of the present invention is to provide a digital frequency discriminator where the upper frequency limit of the discriminator is set by the period $T_1$ of the delay timer.

Still another object of the present invention is to provide a digital frequency discriminator where the bandwidth of the discriminator is determined by the period $T_2$ of the gate timer.

Yet another object of the present invention is to provide a digital frequency discriminator where the periods $T_1$ and $T_2$ are controlled by simple resistance capacitance timing circuits.

Still another object of the present invention is to provide a digital frequency discriminator where the delay timer and gate timer each take the form of a conventional, commercially available integrated circuits costing on the order of $0.20 each.

Briefly stated, and in accord with one embodiment of the invention, a signal-synchronized digital frequency discriminator digitally processes input pulses including first and second time separated input pulses to determine if the frequency of any two sequential pulses lie within a predetermined frequency band with upper and lower frequency limits for at least a predetermined period of time. A delay timer having a pulse detector is coupled to sense the input pulses and operate in a pulse sensing standby mode prior to receipt of the first input pulse. The delay timer switches into a time-limited active mode upon receipt of the first input pulse to define a fixed duration delay interval having a duration equal to the period of the upper frequency limit of the frequency band. The delay timer switches back into the pulse sensing standby mode upon completion of the delay interval. A gate timer is coupled to an output of the delay timer and switches from a standby mode into a time-limited active mode upon completion of the delay interval to define a fixed duration bandwidth interval. A monitoring circuit includes a first input coupled to the pulse detector to monitor the input pulse train and a second input coupled to monitor an output of the gate timer. The monitoring circuit generates a frequency coincidence signal only if the second input pulse is received during the bandwidth interval to indicate the presence of input pulses having a frequency within the predetermined frequency band. A recognition circuit is coupled to monitor the output of the coincidence detector to ensure that the coincidence signal is received for at least a predetermined period of time.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

DESCRIPTION OF THE PREFERRED EMBODIMENT

In order to better illustrate the advantages of the invention and its contributions to the art, a preferred hardware embodiment of the invention will now be described in some detail.

Figure 1:
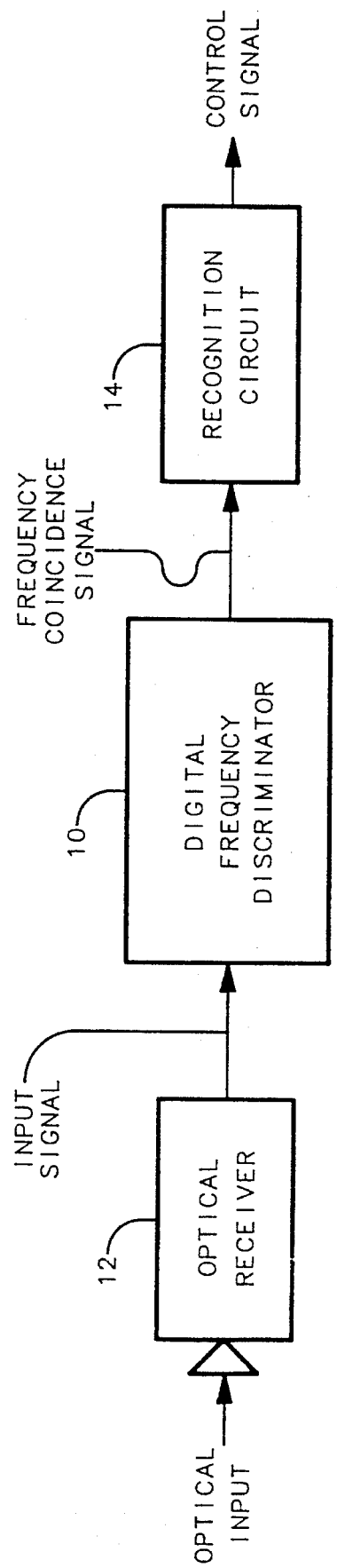
FIG. 1 represents a generalized block diagram representation of the signal synchronized digital frequency discriminator of the present invention.

Referring now to FIG. 1, a non-synchronized digital frequency discriminator 10 digitally processes a stream of input pulses provided by optical receiver 12 which receives an optical input signal and converts it into a stream of electrical input pulses. If the frequency of any two sequential input pulses lies within a predetermined frequency band defined by upper and lower frequency limits, the signal-synchronized digital frequency discriminator 10 transmits a frequency coincidence signal to recognition circuit 14. Upon determining that the coincidence pulses are received for at least a minimum period of time, recognition circuit 14 generates a control signal which can be used to activate a variety of different devices.

Figure 2:
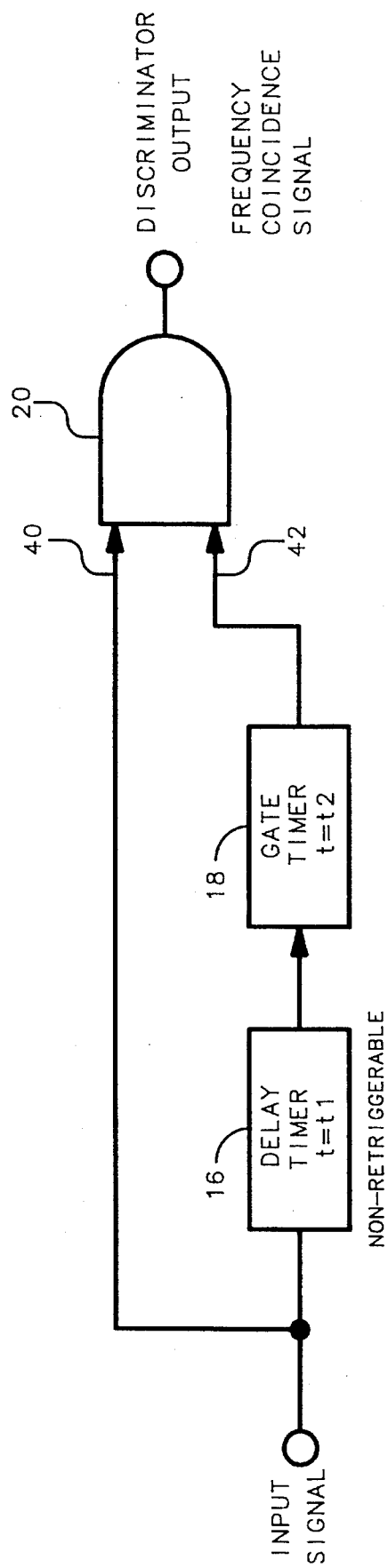
FIG. 2 represents a simplified block diagram representation of the digital frequency discriminator of the present invention.
Figure 3:
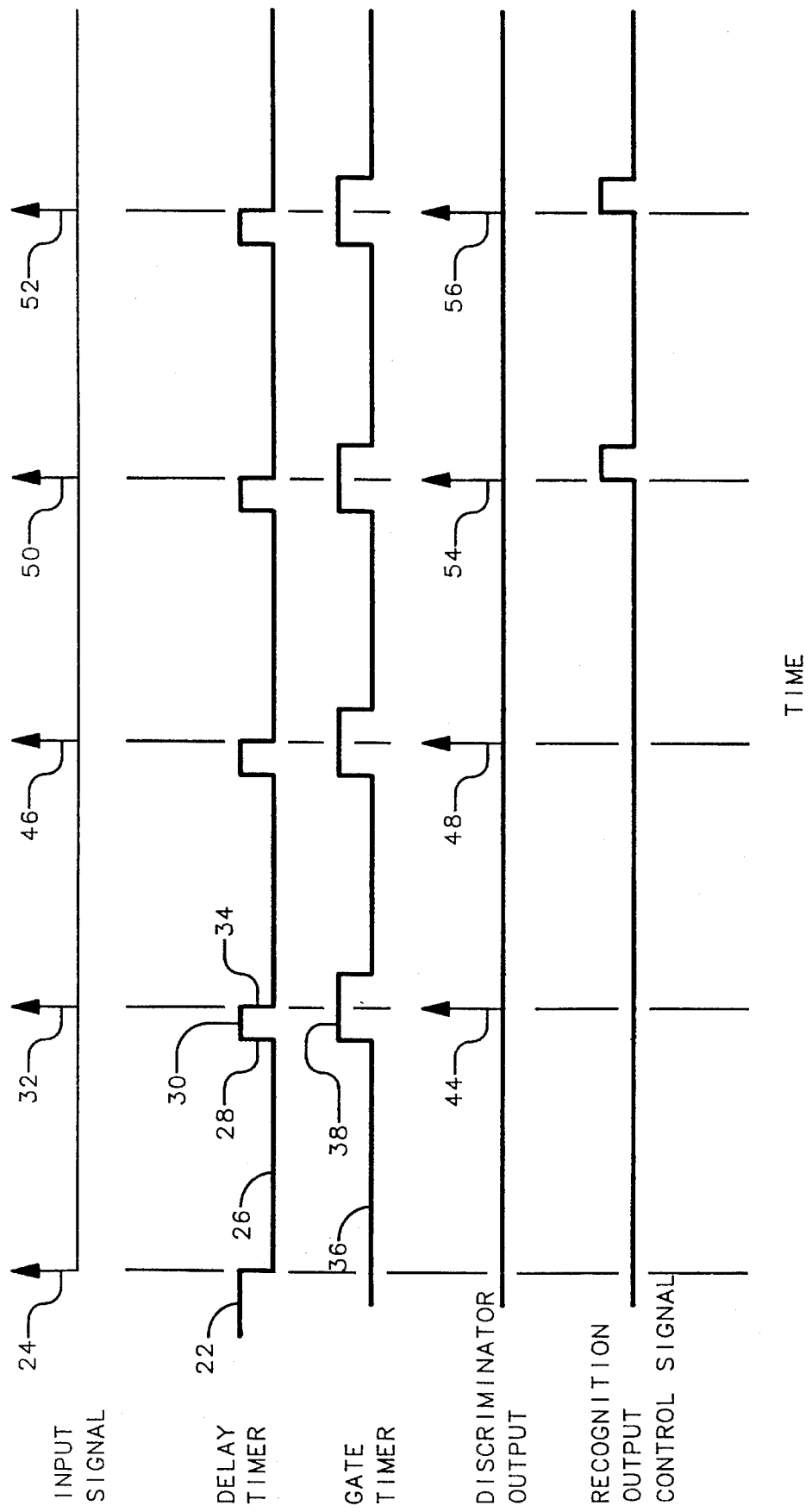
FIG. 3 represents a timing diagram illustrating operation of the digital frequency discriminator illustrated in FIG. 2.
Figure 4:
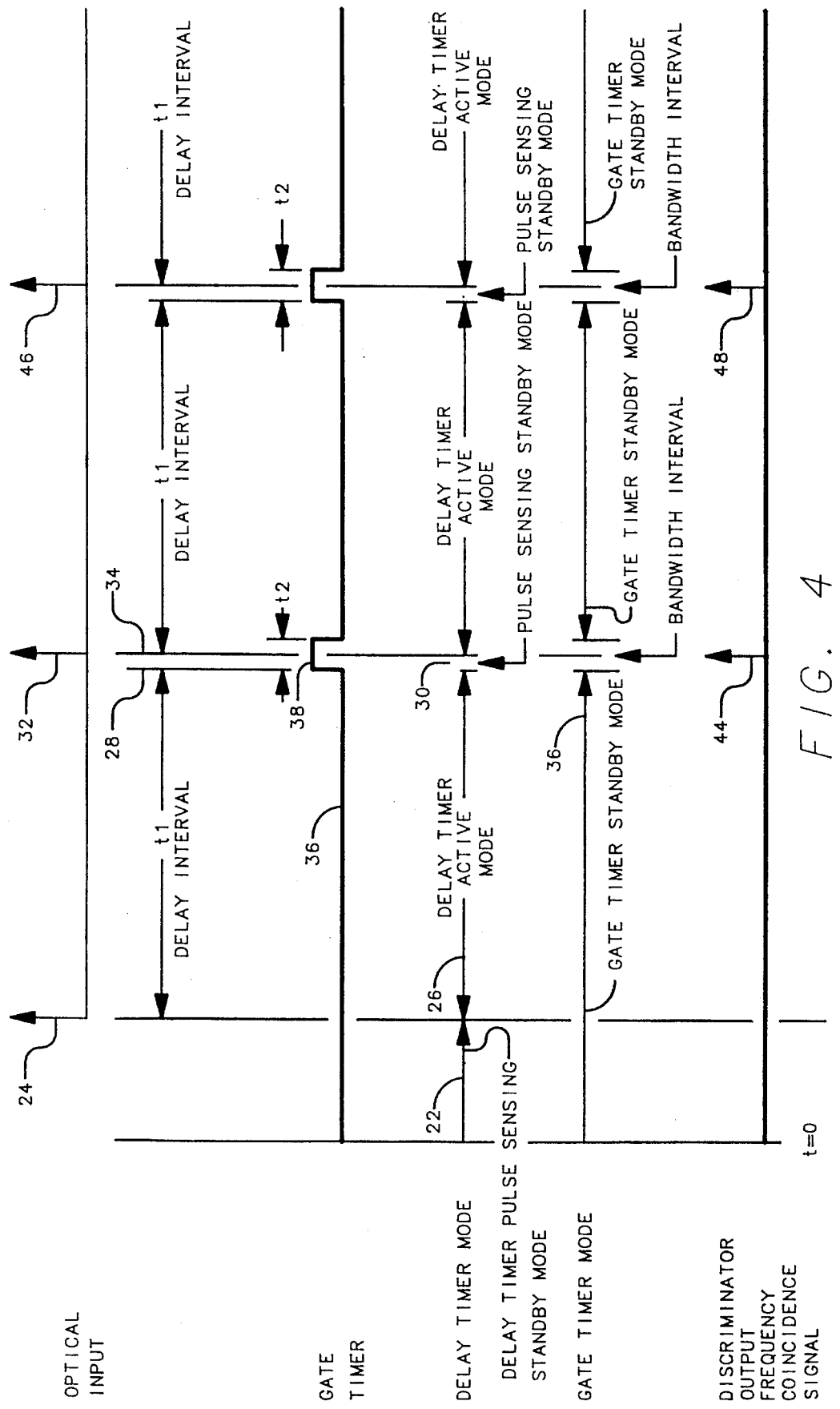
FIG. 4 represents a timing diagram illustrating the signal synchronized timing and detection of the signal-synchronized digital frequency discriminator of the present invention.

Referring now to FIGS. 2–4, digital frequency discriminator 10 includes a delay timer 16, a gate timer 18 and a coincidence detector a monitoring circuit 20 as illustrated in the FIG. 2 schematic diagram.

Delay timer 16 includes a pulse detector coupled to sense the input pulses provided by optical receiver 12. As illustrated by the FIG. 3 and 4 timing diagrams, delay timer 16 operates in a pulse sensing standby mode prior to the time that the first input pulse is received. In FIGS. 3 and 4, the initial delay timer pulse sensing standby mode is designated by reference number 22. The duration of pulse sensing standby mode 22 will be defined by the time interval between the time that digital frequency discriminator 10 is powered up and the time that first input pulse 24 is received on the input terminal of delay timer 16.

Upon detecting input pulse 24, delay timer 16 switches into a time-limited active mode designated in FIG. 4 by reference number 26 to thereby define a fixed duration delay interval having a duration $T_1$ corresponding to and defining the period of the upper or high frequency limit of the frequency band to be detected by the discriminator.

At the end of delay timer interval $T_1$ designated by reference number 28, the output of delay timer 16 transitions from a low logic level to a high logic level, switching delay timer 16 back into the pulse sensing standby mode designated in the timing diagrams by reference number 30.

If as shown in the FIGS. 3 and 4 timing diagrams, a second in-band optical signal 32 is transmitted to the input of delay timer 16, the output of delay timer 16 transitions from a high logic level to a low logic level as designated by reference number 34.

The end of period up going transition of delay timer 16 is designated by reference number 28. That transition is coupled to the input of gate timer 18 and switches the gate timer from a standby mode designated by reference number 36 into a time-limited active mode designated by reference number 38 to define a fixed duration bandwidth interval equal in duration to the period $T_2$ of gate timer 18.

The monitoring circuit or coincidence detector 20 includes a first input terminal 40 coupled to the pulse detector input of digital frequency discriminator 10 to directly monitor the input pulses. Monitoring circuit 20 also includes a second input terminal 42 which is coupled to monitor the output from gate timer 18. Monitoring circuit 20 generates the frequency coincidence signal which represents the discriminator output signal designated by reference number 44 when second input pulse 32 is received during the bandwidth interval to thereby indicate that the frequency of the input pulse train lies within the predetermined band defined by the low frequency and high frequency bandwidth limits.

If a third in-band optical signal 46 is subsequently transmitted to and processed by digital frequency discriminator 10 as shown by the FIGS. 3 and 4 timing diagrams, delay timer 16 and gate timer 18 are activated as explained above to generate a second digital frequency output signal 48.

The FIG. 3 timing diagram illustrates the receipt of additional in-band optical input signals designated by reference numbers 50 and 52 which result in the generation of discriminator output signals 54 and 56 as shown.

Figure 5:
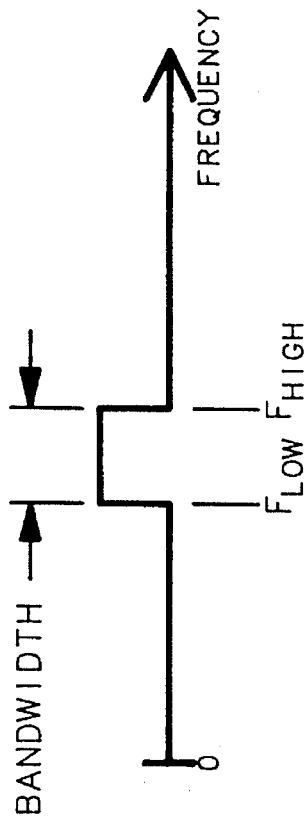
FIG. 5 illustrates the bandwidth properties and bandwidth control parameters of the digital frequency discriminator of the present invention.

Referring now to FIG. 5, the operation of digital frequency discriminator 10 is explained in terms of the frequency domain as opposed to the time domain explanation shown in the FIG. 3 and FIG. 4 timing diagrams. As illustrated by FIG. 5, the high frequency cutoff of digital frequency discriminator 10 is controlled or tuned by the period $T_1$ of delay timer 16. The low frequency cutoff of digital frequency discriminator 10 is controlled by the sum of the periods $T_1$ and $T_2$ of delay timer 16 and gate timer 18. The bandwidth of digital frequency discriminator 10 is controlled by the period $T_2$ of gate timer 18.

Accordingly, FIG. 5 demonstrates how the high frequency cutoff, low frequency cutoff and bandwidth of digital frequency discriminator 10 can be controlled by appropriate variations in $T_1$ and $T_2$.

Figure 6:
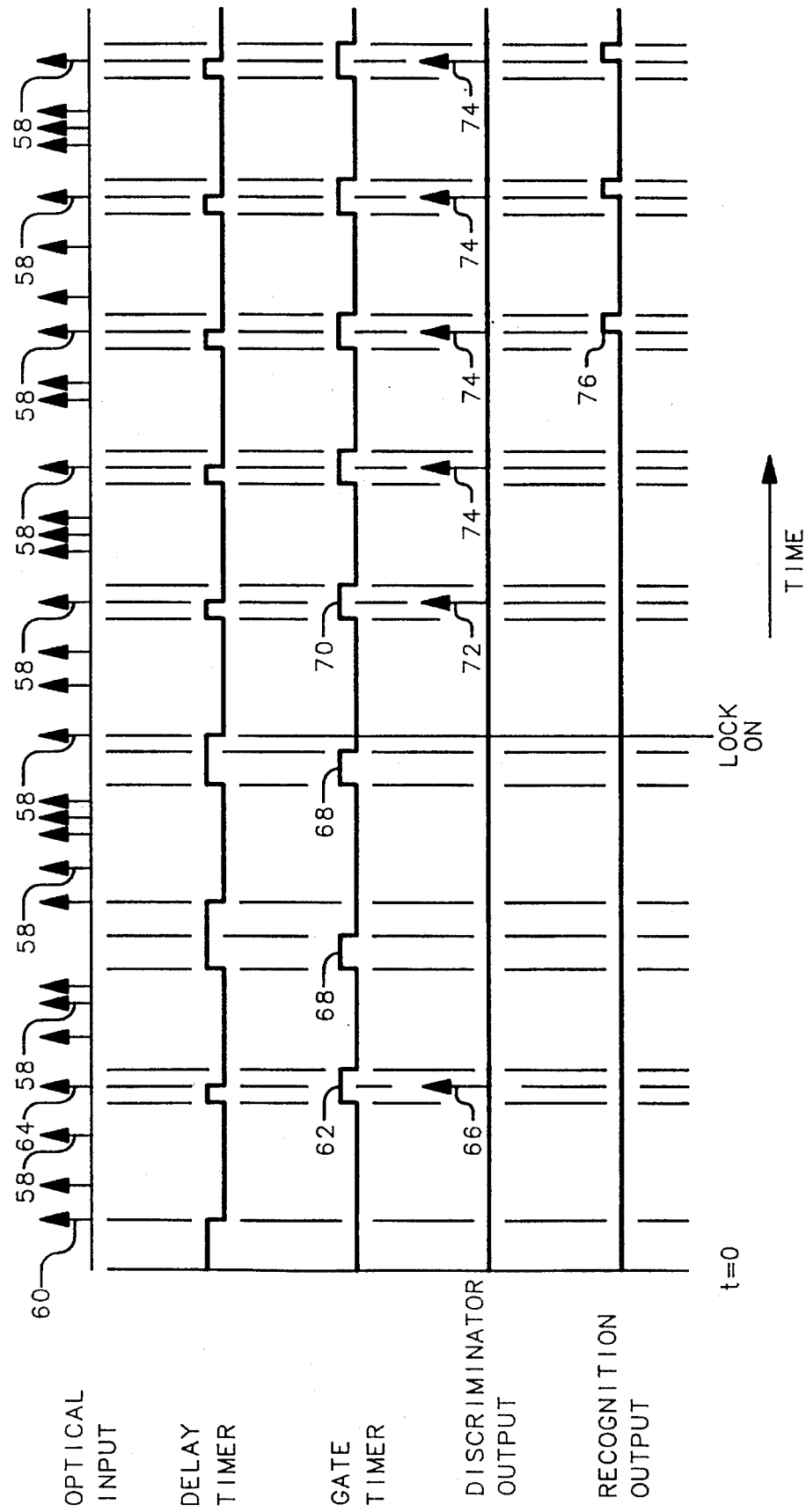
FIG. 6 represents a timing diagram illustrating the operation of the digital frequency discriminator during transition or signal lock-on configuration with the discriminator circuit operating in a noisy signal environment.

Referring now to the FIG. 6 timing diagram, the signal lock on function of digital frequency discriminator 10 is illustrated by the presence of a single in-band pulse train designated by reference number 58 in a noisy optical signal environment including a random series of out of band optical signals which are illustrated in the upper line of the FIG. 6 timing diagram but not designated by reference numbers.

As illustrated by FIG. 6, initial power up of digital frequency discriminator 10 at time T=0 subsequently results in activation of delay timer 16 by detection of the first optical input pulse designated by reference number 60. During the bandwidth interval defined by gate timer 18 and designated by reference number 62, random noise pulse 64 activates monitoring circuit 20, resulting in the generation of a discriminator output pulse as shown by reference number 66.

During the subsequent two bandwidth intervals designated by reference number 68, no coincidence optical pulses are detected by monitoring circuit 20 and accordingly, no discriminator output signal is generated.

During the next bandwidth interval designated by reference number 70, the presence of in-band signal 58 results in signal coincidence which activates monitoring circuity 20 to generate a discriminator output pulse designated by reference number 72. As of this point in time, digital frequency discriminator 10 has synchronized its operation to the single in-band optical input signal 58 and will subsequently generate a consecutive series of discriminator output pulses as designated by reference number 74 as long as in-band pulses are received. If recognition circuit 14 as illustrated in the FIG. 1 is configured to generate a control signal upon receiving two or more consecutive discriminator output pulses, recognition circuit 14 will generate the control signal designated by reference number 76 as illustrated in the FIG. 6 timing diagram.

FIG. 6 demonstrates how the digital frequency discriminator 10 transitions from an operating state completely out of phase with the in-band optical input signal sought to be detected to an in-phase operating state where every consecutive in-band optical input signal is detected and each of the random noise pulses is either rejected or does not otherwise interfere with the operation of the digital frequency discriminator.

Figure 7:
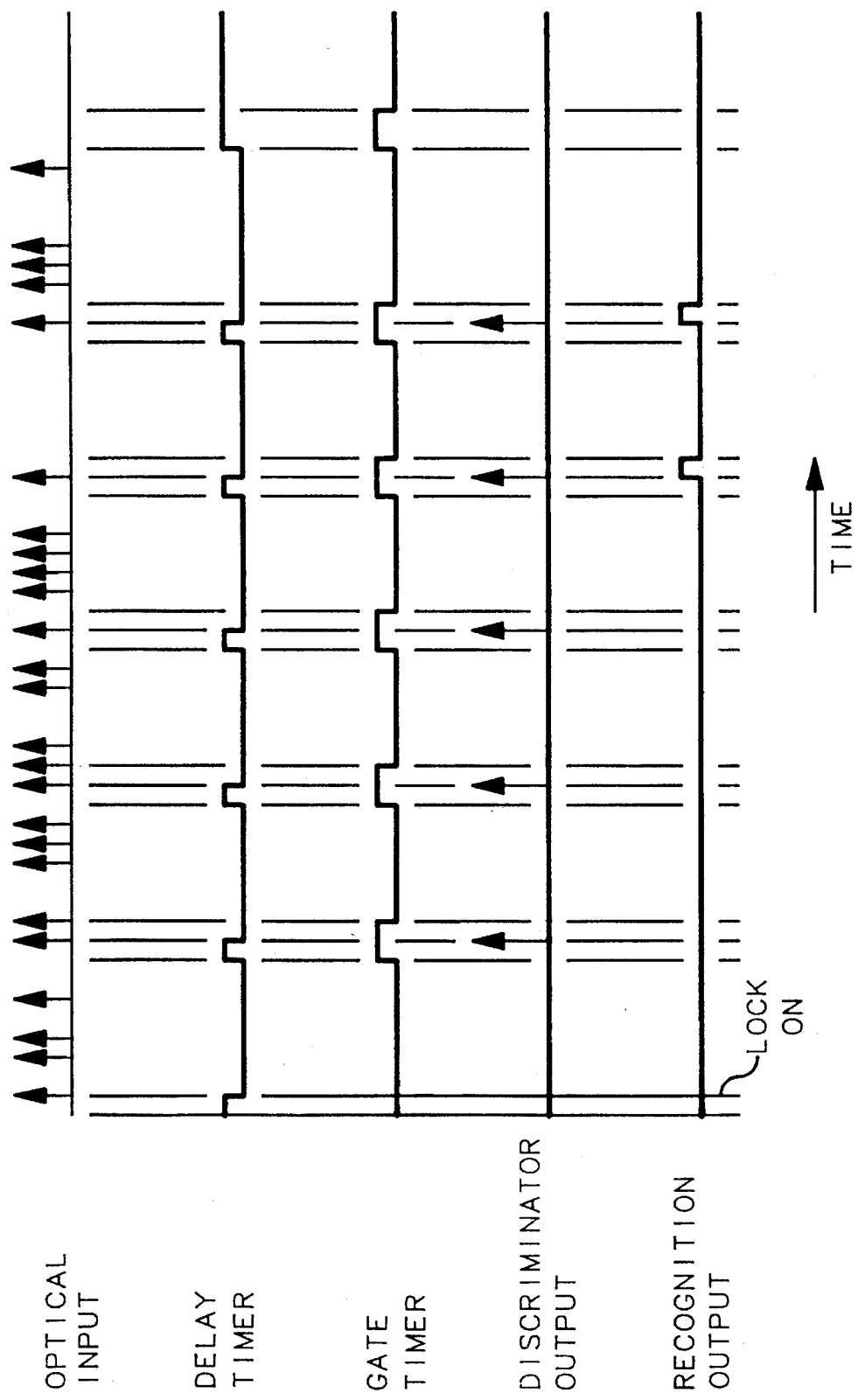
FIG. 7 represents a timing diagram illustrating operation of the digital frequency discriminator in a noise-filled signal environment.

The FIG. 7 timing diagram illustrates post-signal lock on in-phase operation in a noisy signal environment. FIG. 7 shows that after signal lock on, the digital frequency discriminator is highly resistant to noise pulses.

Figure 8:
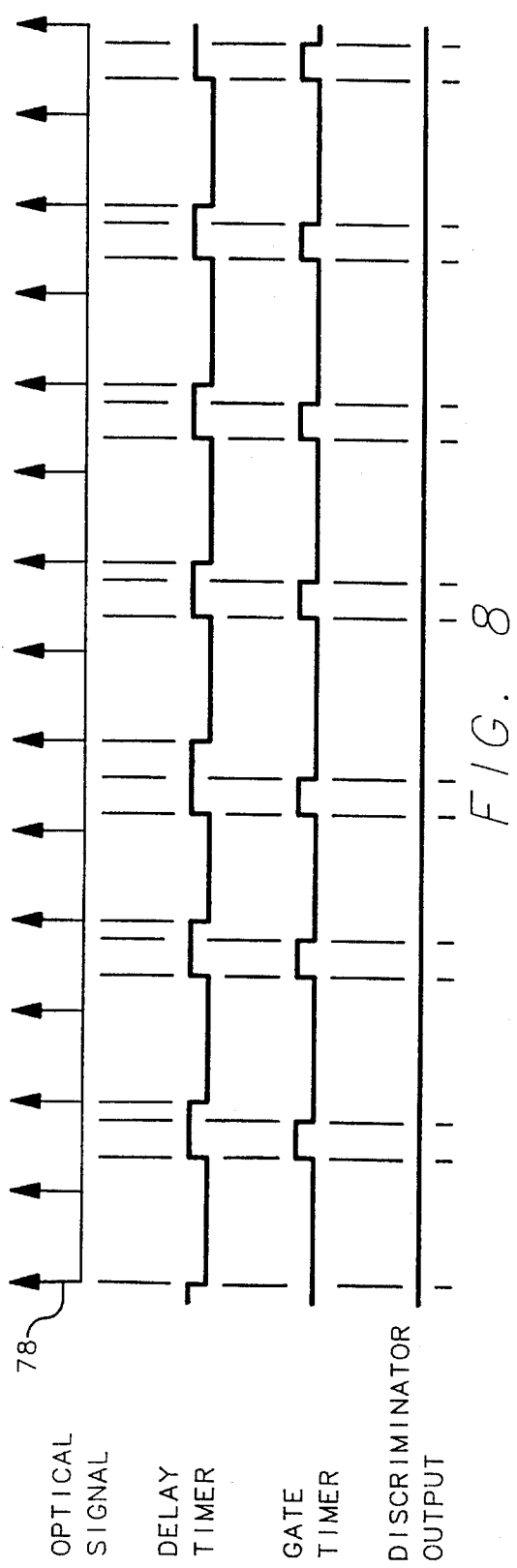
FIG. 8 represents a timing diagram illustrating an optical input will signal having a high frequency out of bandwidth frequency.

As shown in the FIG. 8 timing diagram, digital frequency discriminator 10 processes a single high frequency out of bandwidth optical input signal designated by reference number 78. The out-of-band condition of optical signal 78 during the time interval shown in FIG. 8 fails to place any optical pulses of signal 78 within the bandwidth interval defined by gate timer 18. Accordingly, monitoring circuit 20 of digital frequency discriminator 10 produces no output pulses.

Figure 9:
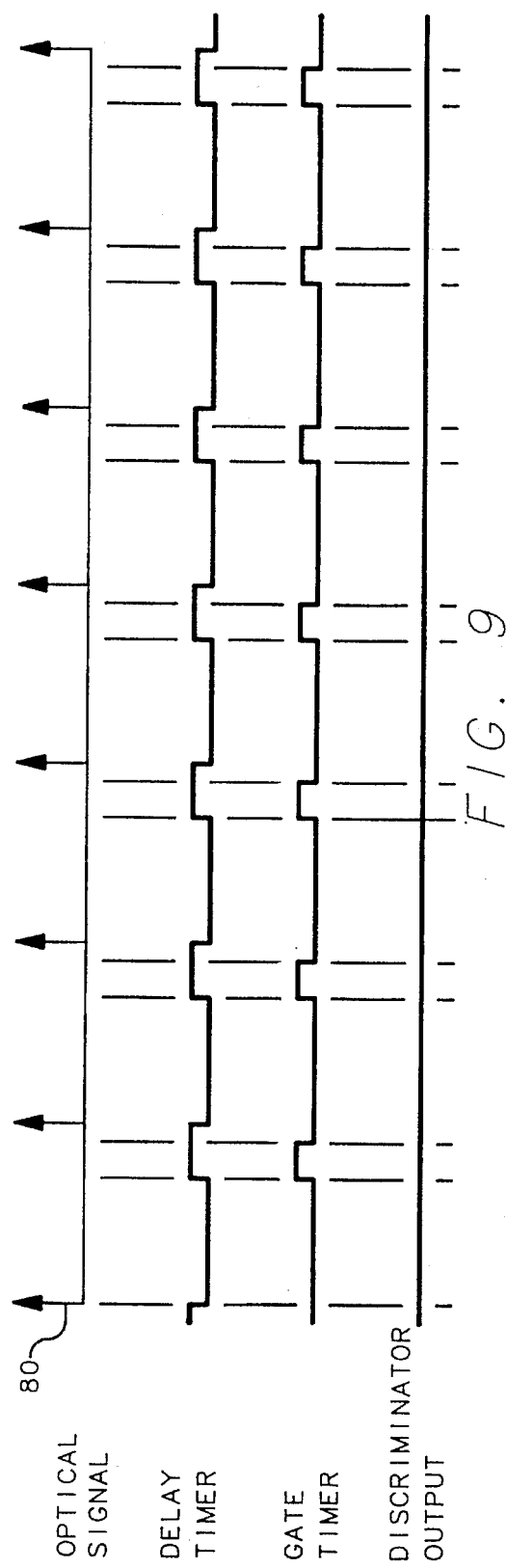
FIG. 9 represents a timing diagram illustrating an optical input signal with a low frequency out of bandwidth signal.
Figure 10A:
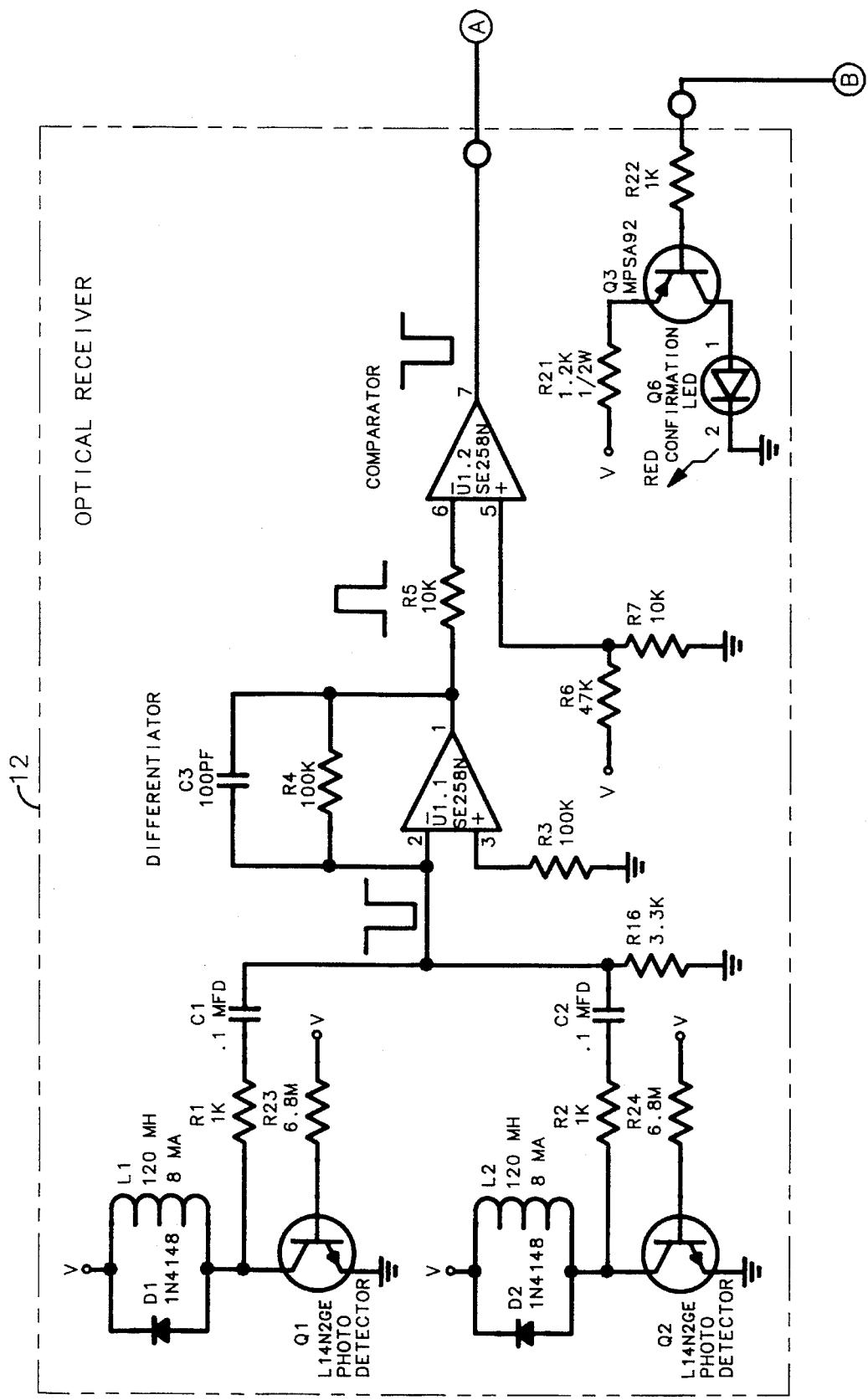
FIG. 10 including individual circuit elements illustrated in FIGS. 10A, 10B, 10C and 10D represents a detailed schematic diagram of one preferred embodiment of the digital frequency discriminator circuit of the present invention.
Figure 10B:
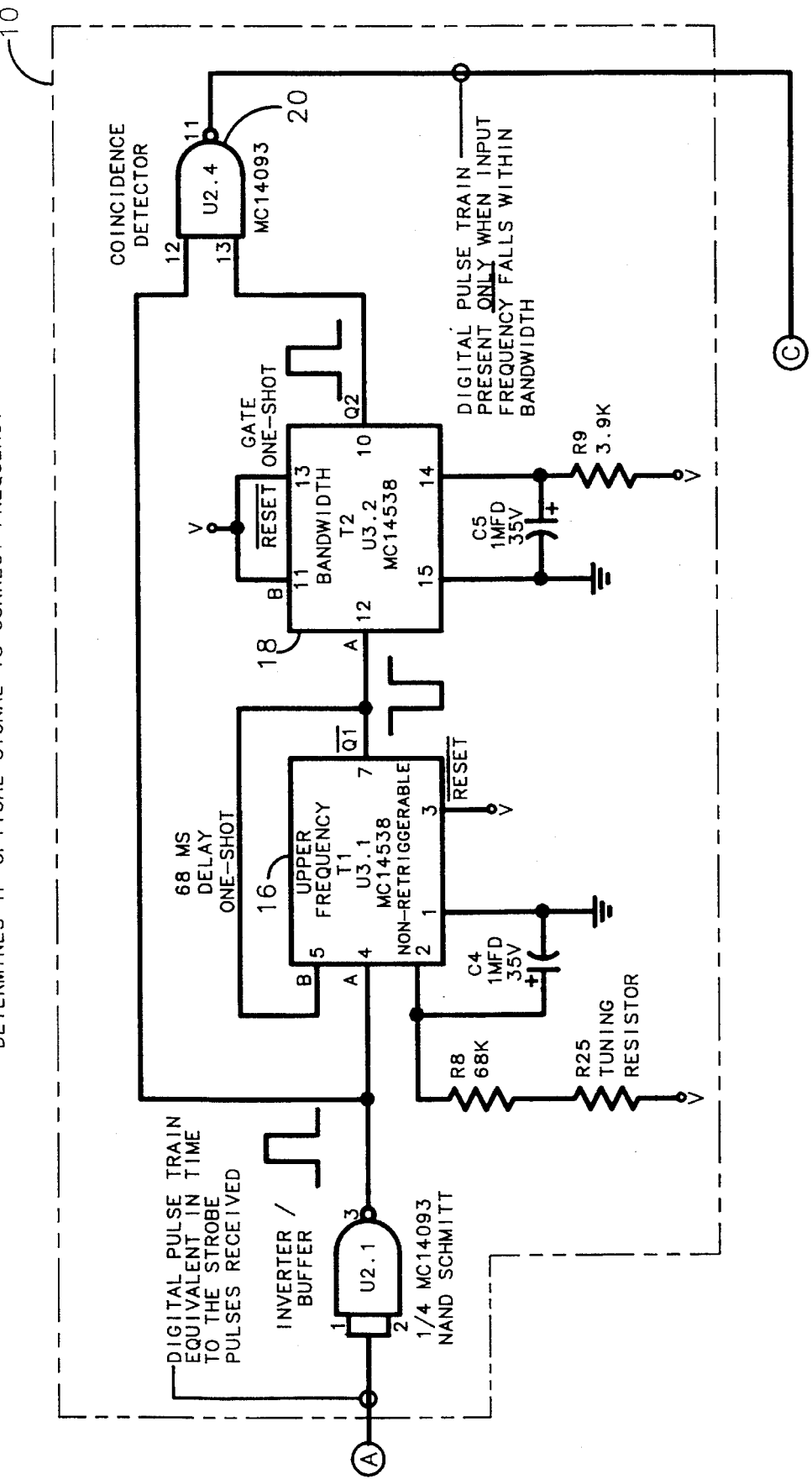
Figure 10C:
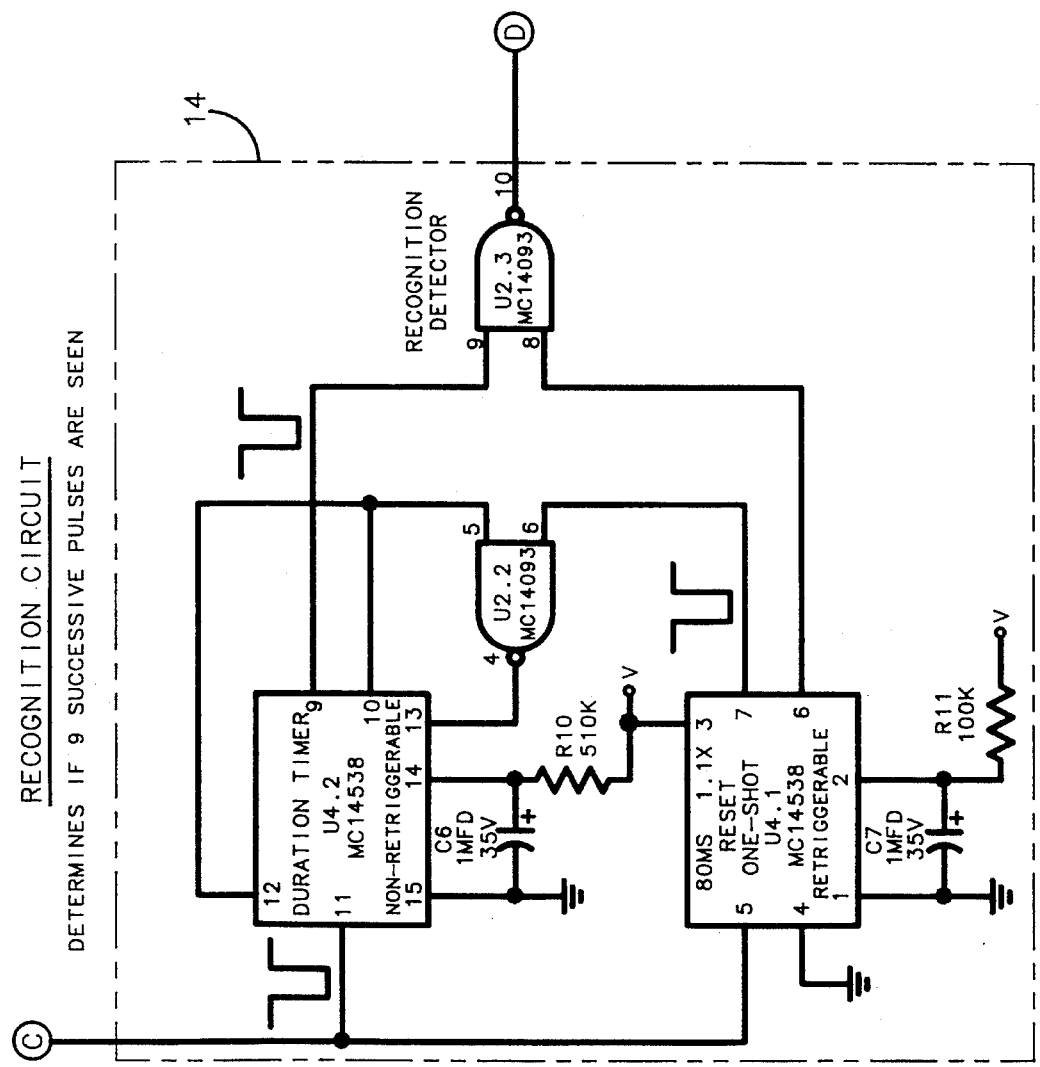
Figure 10D:
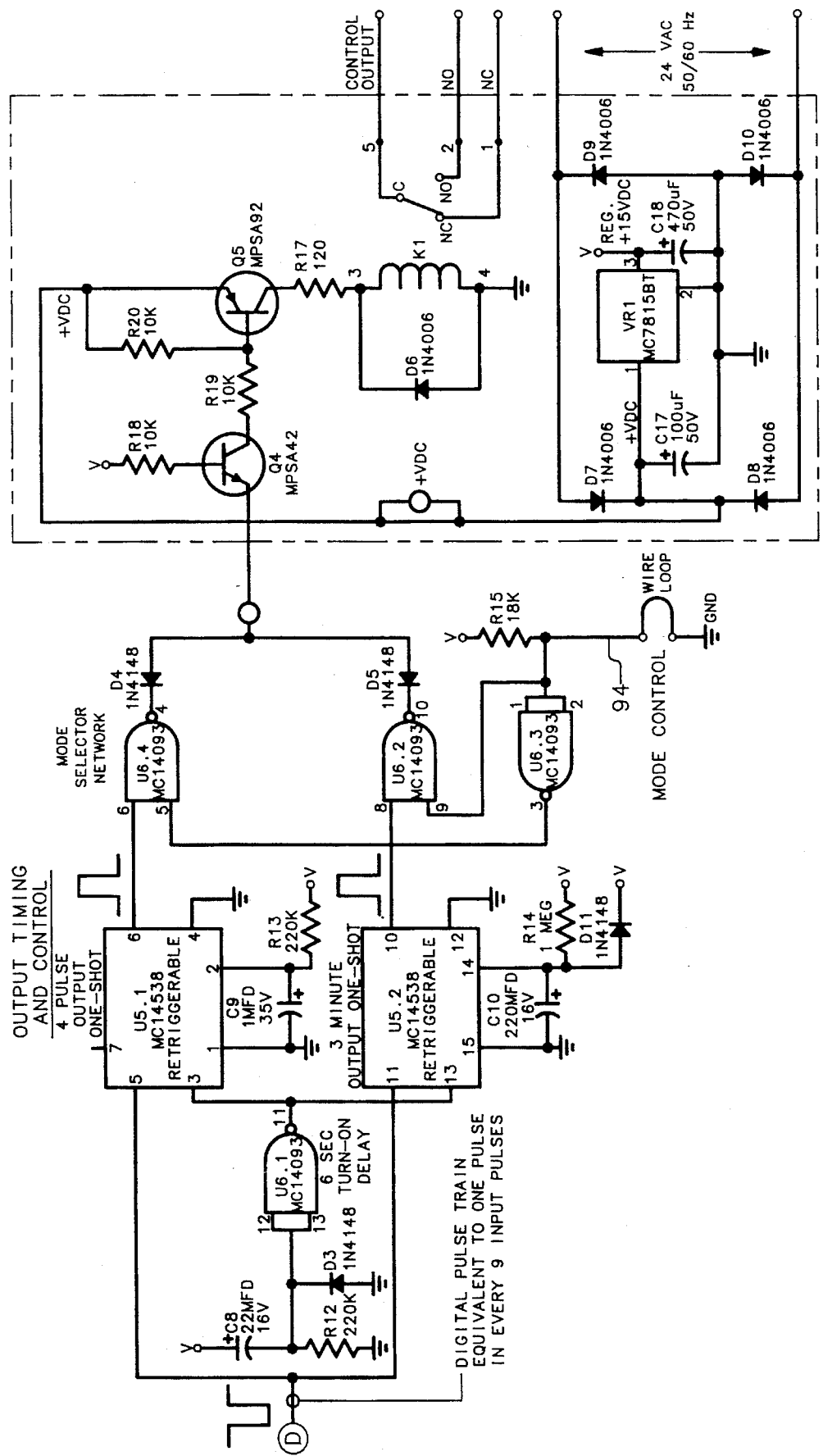

The FIG. 9 timing diagram illustrates operation of the digital frequency discriminator 10 in the presence of an optical input signal designated by reference number 80 with a low frequency out of bandwidth frequency. As was the case with the FIG. 8 timing diagram, no optical signals are detected during the bandwidth interval defined by gate timer 18. Accordingly, monitoring circuit 20 fails to generate any discriminator output pulses.

Figure 11:
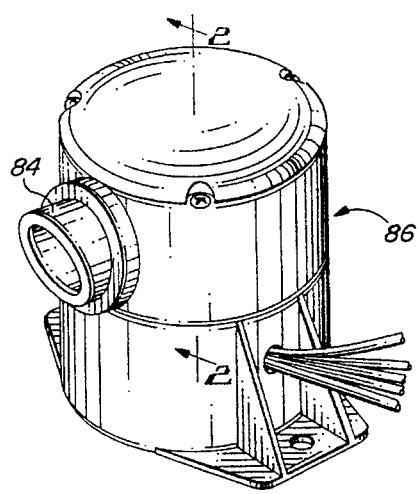
FIG. 11 represents a perspective view of a housing or enclosure for one embodiment of the digital frequency discriminator of the present invention for optical signal receiving applications.
Figure 12:
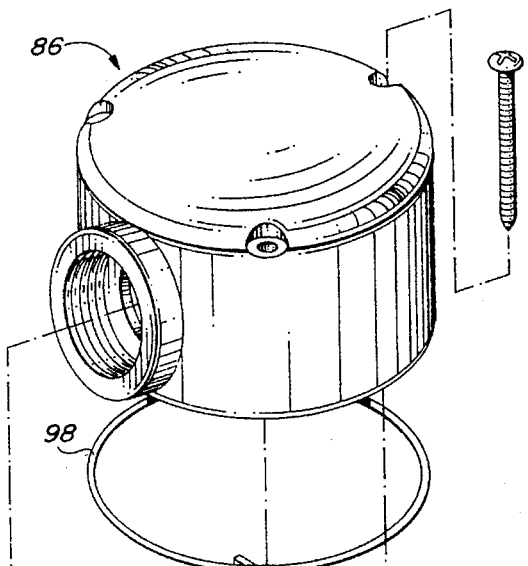
FIG. 12 represents a partially cutaway side view of the housing illustrated in FIG. 11.
Figure 12:
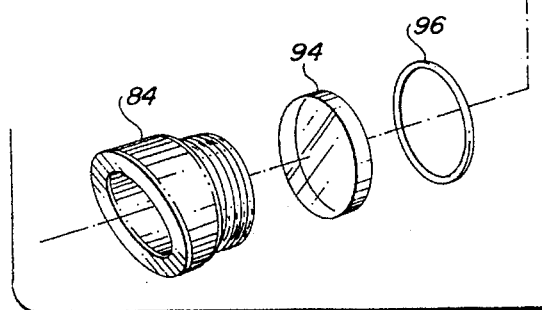
Figure 12:
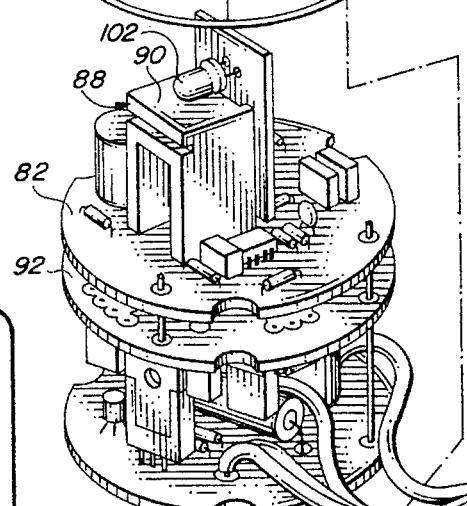
Figure 12:
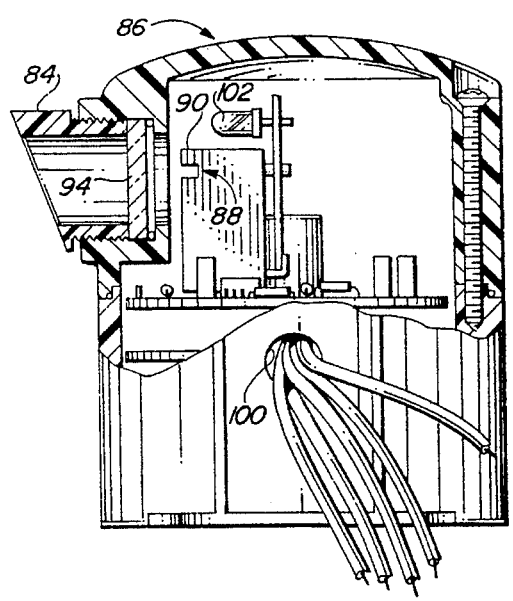
Figure 13:
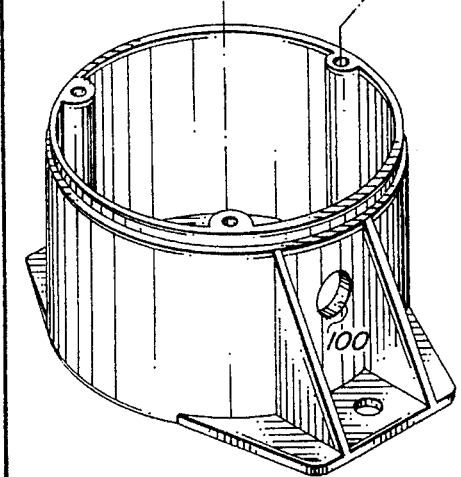
FIG. 13 represents an exploded view of the housing illustrated in FIG. 11, particularly illustrating the placement and configuration of the internal circuit elements of the digital frequency discriminator.

Referring now to the detailed FIG. 10 electrical schematic diagram, a specific preferred embodiment of the invention will now be described in detail. As illustrated in FIGS. 11–13, this particular embodiment of the invention can be fabricated on a series of three vertically stacked, circular printed circuit boards as particularly illustrated in the exploded FIG. 13 perspective diagram.

Optical receiver 12 may be manufactured on a single printed circuit board 82 as shown in FIG. 13. Phototransistors Q1 and Q2 serve to convert an optical input signal into an electrical output signal. These transistors are selected based on the optical characteristics of elongated optical channel 84 of circuit housing 86 as well as the configuration of aperture 88 of aperture block 90 which serves to mount and control the optical input signal directed to the phototransistors.

When light is incident upon the exposed photosensitive surface of transistors Q1 and/or Q2, base current begins to flow and the affected transistor passes an appropriate current through its collector junction.

The emitters of the photo-transistors are grounded and include inductors L1 or L2 coupled in series with the photo-transistor collectors. Inductors L1, L2 are designated to exhibit a high impedance to rapidly changing signals such as during detection of rapid onset strobe flash pulses. The DC impedance of inductors L1, L2 is considerably lower (around 70 Ohms) than the AC impedance of these inductor. The "Q" of inductors L1, L2 is selected to approximate 120 to provide an impedance ratio on the order of about 120. As a result, the voltage response to an AC signal of the type sought to be detected by digital frequency discriminator 10 is around one hundred and twenty times greater than the voltage response to a DC signal such as that caused by ambient light levels.

Referring again to the FIG. 10 schematic diagram, the voltage at the collector junction of the photo-transistors decreases with increasing incident light levels. Operational amplifier U1.1 is configured as a differentiator by coupling capacitors C1 and C2 and by feedback resistor R4. Resistors R1 and R2 limit the current and stabilize the differentiator. Capacitor C3 eliminates oscillation and may not be necessary in all circuit applications. Resistor R3 biases the positive input terminal for a differentiator configuration. Output pin 1 of operational amplifier U1.1 is normally at ground and for rapidly changing light inputs rises above ground.

Resistor R5 isolates the output of the differentiator from comparator U1.2 which is coupled to differentiator U1.1. Comparator U1.2 serves as a pulse shaper. Resistors R6 and R7 are coupled as a voltage divider and provide a signal to the positive comparator terminal. When the pulse voltage from the differentiator goes above the voltage on the voltage divider, the comparator output goes low. The voltage divider is normally set at approximately twenty percent of the power supply voltage, but may be varied to adjust the circuit sensitivity.

Optical receiver 12 supplies a digital pulse train coordinated in time with the optical output pulses generated by a strobe flash lamp lying within the field of view of elongated optical channel 84 of housing 86. The specific configuration of inductors L1, L2 in combination with differentiator U1.1 provide very high sensitivity to AC light signals such as strobe flash lamp signals and a very low sensitivity to DC or ambient light conditions.

Under certain conditions, it is possible to saturate phototransistors Q1 and Q2 with DC light. In that case optical receiver 12 will be unable to detect strobe flash lamp signals. In some circumstances, one photo-transistor may be saturated while the second photo-transistor will operate to pass a detected AC signal. This is one significant benefit of using two photo-detector transistors rather than one. In many applications, the optical receiver will operate acceptably with only a single photo-detector in the form of a phototransistor or equivalent device.

With a properly designed optical input aperture provided by the elongated optical channel 84 serving as an external optical aperture combined with internal optical input aperture 88, the individual fields of view of the two phototransistors can be configured to be semi-overlapping so that when one transistor is saturated, the other transistor will not be fully saturated. This arrangement facilitates operation under the most adverse ambient lighting conditions.

As illustrated in FIGS. 12 and 13, the elongated optical channel may take the form of a hollow cylindrical body 84 secured by a male threaded coupling to a compatible, female threaded optical input aperture disposed in the side of housing 86. A non-refractive, cylindrical viewport element or glass 94 is inserted as shown between optical channel 84 and housing 86. A weather-tight seal is formed in the moisture flow path between optical channel 84 and the optical input aperture of housing 86 by O-ring seal 96. A substantially larger O-ring seal 98 assists in forming a weather-tight seal between the upper and lower half sections of housing 86.

Utilization of a threaded coupling between optical channel 84 and the optical input aperture of housing 86 enables a user to readily substitute a second viewport element 94 having a higher or lower level of light attenuating material or tinting to thereby either increase or decrease the intensity of the ambient light transmitted to the light detecting phototransistors positioned behind the aperture 88 of aperture block 90. Since the present invention can be utilized in applications both within a building as well as in ambient daylight, the ability to easily substitute higher or lower level light attenuating viewport elements 94 maximizes the performance and adaptability of the unit.

As shown in FIGS. 12 and 13, aperture block 90 includes a vertical face located in proximity to viewport element 94 and to the optical input aperture of housing 86. The face of aperture block 90 includes light transmissive aperture 88 of a defined size or cross sectional area to control or limit the intensity of the optical pulses passed through viewport element 94 and the optical input aperture to phototransistors Q1 and Q2 located behind aperture 88. The design and configuration of aperture block 90 is generally shown in FIGS. 12 and 13. The design of the internal structure of aperture block 90 is both non-critical and conventional and is well known to one of ordinary skill in the art.

The height of the face of aperture block 90 and the elevation of its upper surface must be limited as shown in FIG. 12 so that an unobstructed optical path or gap remains between visual signal detection confirmation indicator or LED 102 and a human observer standing at a location spaced apart from housing 86. As long as the human observer remains in a line of sight position relative to the optical path defined by (1) optical channel 84, (2) the optical input aperture of housing 86 and (3) confirmation LED 102, the observer will be able to see the LED illuminate from a substantial distance and can thereby determine whether the entire discriminator circuit either is or is not operating properly.

As shown in FIGS. 12 and 13, LED 102 is mounted on a separate, vertically oriented printed wiring board to elevate it above the upper surface of aperture block 90. LED 102 extends to the left from the printed wiring board toward the optical input aperture to thereby place LED 102 within the optical gap and in the field of view of an external observer properly aligned with the relevant optical path.

The field of view of the present invention and the related field of view of the visual signal detection confirmation indicator can be either increased or decreased by changing the length, diameter, or other geometry of optical channel 84. For example, increasing the length of channel 84 decreases the field of view while decreasing its length increases the field of view.

A standard rubber grommet (not shown) surrounds both the interior surface of aperture 100 in housing 86, and the electrical leads which extend through that aperture, thereby creating a substantially weather-tight seal between the interior and exterior of housing 86. The electrical components are typically potted to enhanced system durability.

As illustrated in the FIG. 10 schematic diagram, digital frequency discriminator 10 requires only a limited number of electronic devices and can typically be fabricated on only a single printed circuit board such as intermediate circuit board 92 as shown in FIG. 13. The entire digital frequency discriminator circuit as illustrated in the FIG. 10 schematic includes only five CMOS integrated circuit devices costing on the order of only about $0.20 to $0.30 each. The remaining resistors and capacitors form appropriate RC timing circuits for setting the periods $T_1$ and $T_2$ of delay circuit 16 and gate circuit 18.

Optical receiver 12 passes a digital, CMOS compatible pulse stream to digital frequency discriminator 10. NAND gate U2.1 inverts the signal and buffers it. In the preferred embodiment of the invention, all NAND gates take the form of Schmitt trigger circuits which both clean up the digital signals and ensure CMOS compatibility. A positive going pulse train is provided at the output of NAND gate U2.1.

The pulse train from NAND gate U2.1 is coupled to the input of one-shot gate U3.1 which serves as the delay timer 16 of the digital frequency discriminator 10. Delay timer U3.1 triggers off the rising edge of the output from NAND U2.1. One-shot U3.1 or delay timer 16 is configured as a non-retriggerable device such that the receipt of additional input pulses during its output period $T_1$ has no effect on its timing operation as is clearly shown in the FIGS. 3, 4, 6, 7 and 8 timing diagrams.

The pulse duration or period of non-retriggerable one-shot U3.1 or delay timer 16 is set by resistor R8 and capacitor C4. Resistor R25 serves as a tuning resistor to precisely adjust and control period $T_1$ of delay timer 16. The specific value of R25 is determined during original manufacture and is typically not subsequently changed in the field.

The pulse width or period $T_1$ of delay timer 16 is configured to be slightly less than the period of the signal to be discriminated. In many standard optical signalling applications where the transmitted strobe light frequency is set to equal 14 Hz, $T_1$ is selected to equal approximately 68 milliseconds. The inverted output from delay timer 16 provided at one-shot output pin 7 is fed to one-shot gate timer U3.2 which triggers off the rising edge of the output of delay timer 16. In the FIGS. 3, 4, 6, 7 and 8 timing diagrams described above, positive going logic operation was illustrated and discussed for simplicity. In the FIG. 10 schematic diagram, the logic of the actual circuit devices is just the opposite in that gate timer 18 (one-shot U3.2) actually triggers off the end of period rising edge of delay timer 16, rather than the descending edge as illustrated in the timing diagrams described above.

The pulse width $T_2$ of gate timer 18 or one-shot U3.2 is determined by resistor R9 and capacitor C5. As explained above, gate timer 18 determines the bandwidth of digital frequency discriminator 10.

One-shot U3.2 is configured as a retriggerable one-shot. The retriggerable configuration of this one-shot is not critical since it will have timed out long before receiving another end of period transition from delay timer 16.

The output from gate timer 18 is coupled to an input of NAND gate U2.4 which serves as the monitoring circuit or coincidence detector 20 as described above. If a pulse from the optical receiver 12 arrives at NAND gate U2.4 while gate timer 18 is "on," a frequency coincidence signal will be generated on the output terminal of monitoring circuit 20.

In typical circuit operation with a strobe light transmitter operating frequency of 14 Hz, the bandwidth of digital frequency discriminator 10 may be set to provide a low frequency cutoff of approximately 13.8 Hz and a high frequency cutoff of 14.2 Hz. To obtain this specific bandwidth, the period $T_1$ of delay timer 16 can be set to approximately 70.4 mS while the period $T_2$ of gate timer 18 can be set to approximately 2 mS.

An inverted pulse train from monitoring circuit 20 at the appropriate frequency is transmitted to the input of one-shots U4.1 and U4.2. U4.1 is identified in the FIG. 10 schematic diagram as the reset one-shot and is configured as a retriggerable one-shot. The pulse width of U4.1 is determined by resistor R11 and capacitor C7 and is made to be greater than the periods $T_1+T_2$ of delay timer 16 and gate timer 18. In normal operations with a 14 Hz input signal, the period of reset one-shot U4.1 is set to approximately 80 mS, although its period is not particularly critical. The period of reset one-shot U4.1 must exceed $T_1+T_2$.

One-shot U4.2 serves as a duration timer and is configured as a non-retriggerable device. Timer U4.2 is normally set to about nine times the target frequency period. In the case of a 14 Hz input signal, the period of counter U4.2 is normally set at about 650 mS. The pulse width of counter U4.2 is determined by resistor R10 and capacitor C6.

NAND gate U2.2 provides a timer reset function to reset recognition circuit 14 when less than the desired number of consecutive discriminator output pulses are received. When reset one-shot U4.1 times out prior to duration timer U4.2, a negative-going pulse is transmitted to the reset pin of timer U4.2, resetting and terminating its output pulse. This is the only condition that causes NAND gate U2.2 to change state.

NAND gate U2.3 functions as a recognition detector. When duration timer one-shot U4.2 is shut-off prior to reset one-shot U4.1, a pulse is permitted to pass through NAND gate U2.3. A pulse will not pass through NAND gate U2.3 under any other conditions.

The combined operation of gates U4.1, U4.2, U2.2 and U2.3 operates to generate a recognition circuit output pulse when an input optical pulse train of the correct frequency spacing is detected by monitoring circuit 20 of the digital frequency discriminator 10 and recognition circuit 14 has detected nine or more consecutive frequency coincidence signals. When these conditions are satisfied, recognition circuit 14 generates a recognition circuit output signal which is coupled to the following output timing and control circuit.

If less than nine successive frequency coincidence signals are detected by recognition circuit 14, timer reset one-shot U2.2 shuts off first, resetting timer one-shot U4.2 thereby re-initiating operation of recognition circuit 14.

If a continuous train of correctly spaced input pulses is detected by digital frequency discriminator 10, a pulse will pass through recognition detector U2.3 every ninth pulse resulting in a constant refreshing of output one-shots U5.1 and U5.2. This sequence of operation terminates when an in-band frequency is no longer detected.

One-shots U5.1 and U5.2 are both triggered by recognition detector U2.3. The pulse width of gate U5.1 is determined by resistor R13 and capacitor C9 and is set to equal the pulse width of about four input pulses. Specifically for a 14 Hz optical input signal, the pulse width of U5.1 is set at approximately 320 mS. The pulse width of U5.2 is determined by resistor R14 and capacitor C10 and is set for a period of approximately three minutes. U5.2 is configured as a retriggerable one-shot such that its output is extended each time it receives an input pulse.

Gates U6.2, U6.3 and U6.4 form a mode selector network. When mode control lead 94 is grounded, gate U6.1 controls transistor Q5 and the output of relay K1. When mode control lead 94 is floated above ground, gate U6.2 controls the relay to switch between two alternative modes. When mode control lead 94 is grounded, a flashing output is provided by relay K1 with a first period equal to the pulse width of timer U4.2 and second period with a pulse width defined by U5.2, normally approximately half of the U4.2 pulse width.

The grounded configuration of mode control lead 94 and the flashing output signal is particularly useful for garage door applications, garage door opener control applications and applications requiring alarm indicators in the presence of an in-band optical input signal. The flashing ceases upon one shot U5.1 timing out after loss of an in-band input signal.

With a floating mode control lead 94, a long duration output is provided which is extended each time an additional in-band optical input signal is detected. For standard applications, a pulse width of approximately three minutes is selected since it is particularly useful for gate opener applications requiring a long time duration. Diode D11 discharges capacitor C10 upon power down.

A turn-on delay circuit is provided to prevent the two output one-shots (U5.1 and U5.2) from triggering at circuit turn-on. Capacitor C8 and resistor R12 provide a timing network. Approximately six seconds after power turn-on, the voltage across resistor 12 goes lower than half the bias voltage and NAND gate U6.1 goes high. This output is fed into the reset inputs of one-shots U6.1 and U6.2. During this six second period, the one-shots are essentially disabled. Diode D3 provides a drainage path for capacitor C8 upon power down.

Diodes D4 and D5 provide an OR function and isolate the outputs of NAND gates U6.4 and U6.2.

In the power supply and output switching element of the FIG. 10 electrical schematic diagram, resistor R16 controls the current into the base of transistor Q5 which switches relay K1. Relay K1 supplies the system control output by providing normally open output contacts for isolated switching of external circuits.

Referring now to FIGS. 12 and 13, a light emitting diode (LED) 102 serves as a visual signal detection confirmation indicator and is positioned as shown so that when the digital frequency discriminator detects an in-band frequency, LED 102 illuminates, transmitting an optical signal outward through the hollow interior of optical channel 84. This feature of the invention enables an operator to confirm proper operation of the frequency discriminator and dramatically facilitates system troubleshooting in the field. As a result, a troubleshooter can readily determine whether a system failure is caused by a malfunction in the FIG. 10 electrical circuit or by an element of the system coupled to the output of that circuit.

In the preferred embodiment of the invention disclosed in the FIG. 10 electrical schematic diagram, the schematic symbol D6 corresponds to LED 102 illustrated in FIGS. 12 and 13. In other embodiments of this aspect of the invention, a discriminator operation confirmation signal could be produced by a wide variety of alternative signalling devices including an incandescent lamp, an audio frequency signalling device or related devices capable of indicating to a human observer located at a distance from housing 86 that the unit is operating properly and has detected an in-band signal.

Although LED 102 has been shown as being placed within the weather-tight, sealed housing 86, the visual signal detection confirmation indicator of the present invention could also penetrate through the wall of housing 86, be placed outside of housing 86, or be positioned in an alternative location in the general vicinity of housing 86. The most preferred location for LED 102 is as shown in FIGS. 12 and 13 so that an operator can view the optical output signal from LED 102 through the tubular barrel of channel 84 while transmitting an in-band test signal from a location within a field of view of optical channel 84. The preferred location maintains the weatherproof configuration of housing 86 and facilitates disassembly of housing 86 and troubleshooting of the electrical components placed within that housing.

The power supply circuit is one of standard design.

The most critical pulse width in the entire circuit is the pulse width $T_1$ of delay timer 16 which must be individually tuned by resistor R25. The temperature stability of the circuit one-shots is rated at ±4%. The tolerance on capacitor values is ±2%, a tolerance level attainable with high quality tantalum capacitors.

The frequency discrimination characteristics of the present invention can be readily modified by adjustment of only two parameters: the period $T_1$ of delay timer 16 and the period $T_2$ of gate timer 18. In the FIG. 10 embodiment of the invention, resistors R8 and R25 and capacitor C4 operate to set the period $T_1$ of delay timer 16. Resistor R9 and capacitor C5 are configured as an RC network and adjust the period $T_2$ of gate timer 18. The integrated circuits which function as the one-shot delay timer 16 and as the one-shot gate timer 18 can be purchased in quantity for on the order of $0.20 each.

As is clearly evident from the FIG. 10 electrical schematic diagram, no aspect of the circuit utilizes or relies upon a clock input. Instead, the present invention operates in a signal-activated mode where transmission of an input pulse to the input of delay timer 16 transitions the entire frequency discriminator circuit from an inactive or standby mode where no signal processing operation takes place into an active signal processing mode. No timing functions take place in the inactive, non-signal processing modes. During the active, signal processing mode, the timing functions of delay timer 16 and gate timer 18 commence as described above. The timing functions of recognition circuit 14 are not performed unless monitoring circuit 20 generates an output indicating that the input signal being processed by the digital frequency discriminator lies within the selected frequency bandwidth. Accordingly, power consumption and resultant heat generation are held to an absolute minimum since the operating duty cycle of the FIG. 10 circuit will typically be relatively insignificant in duration.

When the digital frequency discriminator circuit of the present invention is coupled to operate in connection with an optical receiver as illustrated in the FIG. 10 schematic diagram, the circuit is particularly useful for remotely controlling systems. For example, fire engines and other emergency vehicles typically include high intensity strobe flash lamps which can be controlled to operate in a high flash rate signalling mode with an output frequency of 14 Hz. If the digital frequency discriminator circuit of the present invention is tuned to receive 14 Hz optical signals, the FIG. 10 device can be coupled in proximity to a fire station garage door system with the control output contacts of relay K1 operatively coupled to either raise or lower the fire station garage door. When approaching the fire station after completing a call, the fire engine strobe lights can be placed in the 14 Hz signalling mode to operate the fire station's garage door. Due to the high intensity output of such strobe flash systems, the FIG. 10 digital frequency discriminator system will be capable of detecting the 14 Hz optical signal transmitted by the fire engine strobe flash system from a distance of several hundred feet or more, resulting in the prompt closure of relay contacts K1 and actuation of the fire station garage door.

Many industrial facilities have electrically actuated, motor-controlled gates for enhancing security during non-business hours. However, it is essential that fire fighting personnel be able to open such gates at any time to respond to an emergency, fire-related problem. In the past, fire departments have been provided by each facility with a key to actuate the electrically controlled security gates.

An optically actuated remote control system using an optical receiver/signal processor of the type illustrated in the FIG. 10 schematic diagram, could be coupled to existing industrial facility motor controlled gate systems enabling existing 14 Hz strobe flash lamp transmitter systems on fire engines to actuate the gates of all industrial facilities so equipped. In such installations, the fire engine crew could actuate the gate of an industrial facility from a distance of several hundred feet and could far more promptly respond to an emergency than by using conventional key-actuated gate unlocking systems.

Another application of the optical control system of the present invention as illustrated in the FIG. 10 schematic diagram relates to the remote control of various different type of systems. For example, an electrically controlled, elevated crane of the type typically used in industrial facilities could be modified to include an appropriate optical detector and the balance of the FIG. 10 discriminator circuit to enable an operator using a strobe flash lamp transmitter operating at an appropriate signalling frequency to control the various crane operating modes. For more complex remote control applications, a multi-frequency optical transmitter could be provided together with a multiple channel digital frequency discriminator circuit.

In certain installations, the number of successive pulses required by recognition circuit 14 could be varied from as few as two or three to a far higher number. In the preferred embodiment of the invention illustrated in the FIG. 10 schematic diagram, recognition circuit 14 has been described as requiring nine successive pulses. This represents a compromise between the rapidity of signal discrimination balanced against elimination of false signal detection. The characteristics of recognition circuit 14 could readily be adjusted as required. In certain installations, the output of the digital frequency discriminator circuit could be coupled to function directly as the control output of the digital frequency discriminator circuit. For a given random noise input condition, the time between output actuations varies exponentially versus the number of input signal period multiples required by recognition circuit 14.

It will be apparent to those skilled in the art that the disclosed signal synchronized digital frequency discriminator may be modified in numerous ways and may assume many embodiments other than the preferred forms specifically set out and described above. For example, a microprocessor could be configured to perform the functions of both delay timer 16 and gate timer 18 as well as monitoring circuit 20 and recognition circuit 14. Numerous different circuit configurations could readily be implemented by one of ordinary skill in the art to perform the functions specifically described above for digital frequency discriminator 10. A wide variety of recognition circuits could also be provided to perform the signal correlation function described above. The optical input signal has been described as a strobe flash lamp, but could also be provided by a laser, a light emitting diode or any other source of relatively high intensity optical frequency or even infrared pulses.

Although the preferred embodiment of the invention was described in connection with the detection of optical input pulses by an optical receiver, the digital frequency discriminator of the present invention can provide its signal processing function on any stream of input pulses which includes first and second time-separated input pulses to determine whether the frequency of any two sequential pulses lies within a predetermined frequency band defined by upper and lower frequency limits. Accordingly, it is intended by the appended claims to cover all such modifications of the invention which fall within the true spirit and scope of the invention.

We claim:

1. A signal-synchronized digital frequency discriminator for digitally processing an optical input signal including first and second time separated optical input pulses to determine if the frequency of any two sequential pulses lies within a predetermined frequency band with upper and lower frequency limits, comprising:

a. an optical signal detector circuit for receiving the optical input signal consisting of a series of spaced-apart optical pulses and for generating an electrical output signal including output pulses synchronized with the optical input pulses;

b. a delay timer having a pulse detector coupled to sense the output pulses from the optical signal detector for operating in a pulse sensing standby mode prior to receipt of the first pulse, for switching into a time-limited active mode upon receipt of the first pulse to define a fixed duration delay interval having a duration equal to the period of the upper frequency limit of the frequency band, and for switching back into the pulse sensing standby mode upon completion of the delay interval;

c. a gate timer coupled to an output of the delay timer for switching from a standby mode into a time-limited active mode upon completion of the delay interval to define a fixed duration bandwidth interval; and d. a monitoring circuit having a first input coupled to the pulse detector to monitor the pulses and a second input coupled to monitor an output of the gate timer for generating a frequency coincidence signal when the second pulse is received during the bandwidth interval to indicate that the frequency of the optical input pulses lies within the predetermined frequency band.

2. The signal-synchronized digital frequency discriminator of claim 1 wherein the upper frequency equals $F_{HIGH}$ and the lower frequency limit equals $F_{LOW}$ and wherein the bandwidth interval is defined by a time interval equal to $$\frac{1}{(F_{LOW})} - \frac{1}{(F_{HIGH})}.$$

3. The signal-synchronized digital frequency discriminator of claim 1 wherein the delay timer includes a non-retriggerable input to prevent the delay timer from responding to pulses received during the delay interval.

4. The signal-synchronized digital frequency discriminator of claim 3 wherein the delay timer includes a monostable multivibrator.

5. The signal-synchronized digital frequency discriminator of claim 1 wherein the delay timer performs no timing function while operating in the standby mode and wherein the gate timer performs no timing function while operating in the standby mode.

6. The signal-synchronized digital frequency discriminator of claim 5 wherein the delay timer performs a timing function only while operating in the time-limited active mode and transitions from the active mode to the standby mode at the end of the delay interval.

7. The signal-synchronized digital frequency discriminator of claim 6 wherein the gate timer performs a timing function only while operating in the time-limited active mode and transitions from the active mode to the standby mode at the end of the bandwidth interval.

8. The signal-synchronized digital frequency discriminator of claims 1 or 7 wherein receipt of the second pulse by the delay timer while the gate timer is operating in the active mode transitions the delay timer from the pulse sensing standby mode into the active mode.

9. The signal-synchronized digital frequency discriminator of claim 1 wherein the delay timer includes a digital one-shot having a non-retriggerable input.

10. The signal-synchronized digital frequency discriminator of claim 9 wherein the gate timer includes a digital one-shot having either a retriggerable or a non-retriggerable input.

11. The signal-synchronized digital frequency discriminator of claim 1 wherein the optical pulses are generated by a strobe flash lamp.

12. The signal-synchronized digital frequency discriminator of claim 11 further including an external housing for enclosing the digital frequency discriminator, the external housing including an outer surface with closed upper and lower end surfaces, a hollow interior and an optical input aperture disposed in the side surface of the external housing in alignment with the optical signal detector circuit for enabling the optical input signal to be transmitted into the interior of the housing for reception by the optical signal detector circuit.

13. The signal-synchronized digital frequency discriminator of claim 12 further including an optical channel with a hollow interior surface coupled to the optical input aperture and oriented perpendicular to and extending outward from the side surface of the external housing for limiting the field of view of the optical signal detector circuit.

14. The signal-synchronized digital frequency discriminator of claim 13 wherein:

a. the optical input aperture in the side of the housing includes a female coupling; and b. the optical channel includes a first end having a male coupling dimensioned for detachably coupling the first end of the optical channel to the female coupling of the optical input aperture.

15. The signal-synchronized digital frequency discriminator of claim 14 further including a first viewport element coupled between the first end of the optical channel and the optical input aperture.

16. The signal-synchronized digital frequency discriminator of claim 15 wherein the first viewport element includes a non-refractive optical element having a controlled amount of light attenuating material to reduce the intensity of the optical input signal passing through the viewport element.

17. The signal-synchronized digital frequency discriminator of claim 16 wherein the female coupling surface of the optical input aperture includes female threads and the male coupling surface of the first end of the optical channel includes male threads to facilitate removal of the optical channel from the optical input aperture and replacement of the viewport element.

18. The signal-synchronized digital frequency discriminator of claim 16 further including a sealing device positioned in series with a moisture flow path extending between the optical channel and the optical input aperture to block the flow of moisture across the moisture flow path.

19. The signal-synchronized digital frequency discriminator of claims 16 or 17 further including a second viewport element geometrically identical to the first viewport element but including a higher level of light attenuating material to reduce the intensity of the optical input signal to a greater degree than the first viewport element.

20. The signal-synchronized digital frequency discriminator of claim 13 further including a visual signal detection confirmation indicator coupled to the monitoring circuit, positioned within the interior of the housing and aligned to be visible through the optical channel from a location spaced apart from the housing, the visual signal detection confirmation indicator being activated in response to reception by the discriminator of an optical input signal having a frequency within the predetermined frequency band.

21. The signal-synchronized digital frequency discriminator of claim 20 wherein the optical pulses have an intensity and wherein the discriminator further includes an aperture block having an upper surface, a face with a defined height and a light transmissive aperture of a defined size to limit the intensity of the optical pulses passed from the optical input aperture to the optical signal detector circuit.

22. The signal-synchronized digital frequency discriminator of claim 21 wherein the height of the face of the aperture block is limited to create an optically clear gap disposed above the upper surface of aperture block and between the optical input aperture and a spaced apart location within the interior of the housing.

23. The signal-synchronized digital frequency discriminator of claim 22 wherein the visual signal detection confirmation indicator is positioned at the spaced apart location above the upper surface of the aperture block and in optical alignment with the gap and with the optical input aperture to enable the visual signal detection confirmation indicator to be viewed from a location spaced apart from the housing.

24. The signal-synchronized digital frequency discriminator of claim 22 wherein the signal detection confirmation indicator includes a light emitting diode.

25. The signal-synchronized digital frequency discriminator of claim 1 wherein the optical pulses are generated by a light emitting diode.

26. The signal-synchronized digital frequency discriminator of claim 1 wherein the optical pulses are generated by a laser.

27. The signal-synchronized digital frequency discriminator of claims 1 or 11 wherein the input pulses include both in-band and out-of-band frequency components.

28. The signal-synchronized digital frequency discriminator of claim 27 wherein the input pulses include a first optical input signal consisting of a series of spaced apart optical input pulses lying within the predetermined frequency band and a second optical input signal including a series of spaced apart optical input pulses lying outside the predetermined frequency band, and wherein the monitoring circuit generates a frequency coincidence signal only in response to the first optical input signal.

29. The signal-synchronized digital frequency discriminator of claim 1 wherein the digital frequency discriminator includes a recognition circuit for receiving the frequency coincidence signal from the monitoring circuit and for generating a recognition signal upon receiving successive frequency coincidence signals for at least a predetermined time interval.

30. The signal-synchronized digital frequency discriminator of claim 29 wherein the frequency coincidence signal includes coincidence pulses and wherein the predetermined time interval is of a sufficient duration to ensure that two or more coincidence pulses are generated before generating the recognition signal.

31. The signal-synchronized digital frequency discriminator of claims 29 or 30 further including a visual signal detection confirmation indicator coupled to receive the recognition signal for generating a visible signal detection confirmation signal in response to reception by the discriminator of an optical input signal having a frequency within the predetermined band.

32. The signal-synchronized digital frequency discriminator of claim 31 wherein the visual signal detection confirmation circuit includes a light emitting diode visible from a location spaced apart from the digital frequency discriminator.

33. A signal-synchronized digital signal discriminator for providing a control signal only in response to an input signal lying within a predetermined frequency range with upper and lower frequency limits wherein the input signal is present for a predetermined period of time, the discriminator comprising:

a. a first non-retriggerable logic circuit with an input coupled to receive the input signal for generating an output pulse having a pulse duration set equal to the period of the upper frequency limit;

b. a second logic circuit with an input operatively connected to the output of the first logic circuit for generating an output pulse with a pulse duration determining the bandwidth of the discriminator;

c. a coincidence detector having a first input coupled to the input of the first logic circuit and a second input coupled to the output of the second logic circuit for comparing the input of the first logic circuit to the output of the second logic circuit and for generating a coincidence signal when the inputs occur simultaneously;

d. a third non-retriggerable resettable logic circuit having a pulse duration set to determine the predetermined period of time and having an input coupled to receive the coincidence signal;

e. a fourth retriggerable logic circuit with a pulse duration set to be slightly longer than the period of the lower frequency limit and having an input operatively connected to the output of the coincidence detector;

f. reset means coupled to sense the output state of the third and fourth logic circuits for resetting the third logic circuit if the fourth logic circuit changes state before the third logic circuit changes state; and g. a recognition detector coupled to the third and fourth logic circuits to generate the control signal when the third logic circuit changes state before the fourth logic circuit changes state.

34. The signal-synchronized digital signal discriminator of claim 33 further including an output timing and control circuit controlled by the output of the recognition detector for generating a selectable discriminator output signal.

35. The signal-synchronized digital signal discriminator of claim 33 wherein the pulse duration of each logic circuit is established by a resistor-capacitor timing network.

36. The signal-synchronized digital signal discriminator of claim 33 wherein the pulse duration of the fourth logic circuit is shorter than two times the period of the first logic circuit.

37. The signal-synchronized digital frequency discriminator of claim 36 including an optical signal detector circuit for receiving an optical input signal consisting of a series of spaced apart optical pulses and for generating an electrical output signal synchronized with the input pulses for further processing by the delay timer.

38. The signal-synchronized digital frequency discriminator of claim 37 further including an external housing for enclosing the digital frequency discriminator, the housing including a cylindrical side surface with closed upper and lower end surfaces, a hollow interior and an optical input aperture disposed in the side surface of the housing in alignment with the optical signal detector circuit, the housing further including an optical channel with a hollow cylindrical interior surface coupled to the optical input aperture and oriented perpendicular to and extending outward from the side surface of the housing for enabling the optical input signal to be transmitted into the interior of the housing for reception by the optical signal detector circuit and for limiting the field of view of the optical signal detector circuit.

39. The signal-synchronized digital frequency discriminator of claim 38 further including a cylindrical, optically transmissive viewport element coupled to the optical channel and having a circular perimeter sealed to the optical channel.

40. The signal-synchronized digital frequency discriminator of claims 33 or 39 further including a visual signal detection confirmation indicator coupled to receive the recognition signal transmitting a visible confirmation signal through the optical input aperture, the viewport element and the optical channel such that the signal can be seen by a human observer spaced apart from the housing when the recognition signal is received by the visual signal detection confirmation indicator.

41. The signal-synchronized digital frequency discriminator of claim 40 wherein the visual signal detection confirmation circuit includes a light emitting diode visible from a location spaced apart from the housing.

42. A method for digitally processing an input pulse stream including a series of sequential pulses to determine if the frequency of any two sequential pulses lies within a predetermined frequency band comprising the steps of:

a. operating a pulse detector in a pulse sensing standby mode prior to receipt of the first input pulse;

b. disabling the pulse detector and switching into a time-limited active mode upon receipt of the first input pulse and defining a fixed duration delay interval commencing upon receipt of the first input pulse;

c. resetting the pulse detector to operate in the pulse sensing standby mode upon completion of the delay interval;

d. defining a bandwidth interval commencing upon completion of the delay interval;

e. generating a frequency coincidence signal when the second input pulse is sensed during the bandwidth interval to indicate that the frequency of the input pulse train lies within the predetermined frequency band; and f. receiving the frequency coincidence signal and generating a recognition signal upon receiving successive frequency coincidence signals for at least a predetermined time interval.

43. The method of claim 42 including the further step of detecting the recognition signal and generating a visual signal detection confirmation signal.

44. The method of claim 43 wherein the signal detection confirmation signal is generated by a light emitting diode positioned to be visible from a spaced-apart location.

* * * * *